United States Patent
Natanzon et al.

(10) Patent No.: US 10,223,023 B1
(45) Date of Patent: Mar. 5, 2019

(54) BANDWIDTH REDUCTION FOR MULTI-LEVEL DATA REPLICATION

(71) Applicant: EMC IP Holding Company LLC, Hopkinton, MA (US)

(72) Inventors: Assaf Natanzon, Tel Aviv (IL); Ravi V. Chitloor, Bangalore (IN)

( * ) Notice: Subject to any disclaimer, the term of this patent is extended or adjusted under 35 U.S.C. 154(b) by 79 days.

(21) Appl. No.: 15/275,764

(22) Filed: Sep. 26, 2016

(51) Int. Cl.
G06F 3/06 (2006.01)

(52) U.S. Cl.
CPC ............ G06F 3/0641 (2013.01); G06F 3/067 (2013.01); G06F 3/0619 (2013.01)

(58) Field of Classification Search
CPC ....... G06F 3/0619; G06F 3/0641; G06F 3/067
USPC .................................................. 711/162, 165
See application file for complete search history.

(56) References Cited

U.S. PATENT DOCUMENTS

| | | | |
|---|---|---|---|
| 7,203,741 B2 | 4/2007 | Marco et al. |
| 7,719,443 B1 | 5/2010 | Natanzon |
| 7,840,536 B1 | 11/2010 | Ahal et al. |
| 7,840,662 B1 | 11/2010 | Natanzon |
| 7,844,856 B1 | 11/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,285,758 B1 * | 10/2012 | Bono ................ G06F 17/30079 707/822 |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |

(Continued)

OTHER PUBLICATIONS

EMC Corporation, "EMC RECOVERPOINT/EX;" Applied Technology; White Paper; Apr. 2012; 17 Pages.

*Primary Examiner* — Pierre Miche Bataille
(74) *Attorney, Agent, or Firm* — Daly, Crowley Mofford & Durkee, LLP (57) ABSTRACT

A computer program product, system, and method for generating coded fragments comprises intercepting I/O writes between a host and a logical unit (LU), sending the I/O writes from a first site to a second site, writing the I/O writes to one or more journal files within a deduplicated storage system at the second site, generating a snapshot of the LU within a deduplicated storage system at the first site, and replicating the snapshot from the deduplicated storage system at the first site to the deduplicated storage system at the second site.

16 Claims, 6 Drawing Sheets

(56) References Cited

U.S. PATENT DOCUMENTS

| | | |
|---|---|---|
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 * | 4/2014 | Natanzon ............ G06F 11/1471 707/634 |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 * | 8/2015 | Frank ...................... G06F 11/14 |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,448,731 B2 * | 9/2016 | Nallathambi ......... G06F 3/0619 |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |

(56) References Cited

U.S. PATENT DOCUMENTS

| | | |
|---|---|---|
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,095,489 B1 | 10/2018 | Lieberman et al. |
| 10,101,943 B1 | 10/2018 | Ayzenberg et al. |
| 2015/0347047 A1* | 12/2015 | Masputra ............ G06F 3/0605 711/114 |
| 2016/0154707 A1* | 6/2016 | Kumarasamy .... G06F 17/30088 707/649 |

* cited by examiner

BANDWIDTH REDUCTION FOR MULTI-LEVEL DATA REPLICATION

BACKGROUND

Computer data is vital to today's organizations and a significant part of protection against disasters is focused on data protection. Conventional data protection systems include backup storage, for storing organizational production site data on a periodic basis. Another conventional data protection system uses data replication, by generating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

One metric commonly used to select a data backup plan is RPO (Recovery Point Objective). RPO describes the interval of time that might pass during a disruption before the quantity of data lost during that period exceeds an organization's maximum allowable threshold or "tolerance."

Continuous data replication systems can be used to continually stream data (in either synchronous or asynchronous modes) to a remote site. Continuous data replication can provide low RPO, but may be less efficient and more costly compared to backup systems. Backup storage systems may also include deduplication and remote data replication capabilities, but generally at much higher RPO compared to continuous data replication. Many organizations use both continuous data replication and backup storage replication to replicate data to a single remote location.

SUMMARY

Described herein are embodiments of systems and methods for reducing bandwidth consumption in data protection systems using multi-level data replication (e.g., using both continuous data replication and back storage replication).

According to one aspect of the disclosure, a method comprises: intercepting I/O writes between a host and a logical unit (LU), sending the I/O writes from a first site to a second site, writing the I/O writes to one or more journal files within a deduplicated storage system at the second site, and generating a snapshot of the LU within a deduplicated storage system at the first site, and replicating the snapshot from the deduplicated storage system at the first site to the deduplicated storage system at the second site.

In various embodiments, replicating the snapshot from the deduplicated storage system at the first site to the deduplicated storage system at the second site comprises: identifying one or more blocks of data within the snapshot that are unique to the deduplicated storage system at the second site including I/Os within the journal files, identifying one or more blocks of data within the snapshot that are redundant to the deduplicated storage system at the second site including I/Os within the journal files, sending the unique blocks of snapshot data from the deduplicated storage system at the first site to the deduplicated storage system at the second site, and sending metadata about the redundant blocks of snapshot data from the deduplicated storage system at the first site to the deduplicated storage system at the second site. In one embodiment, writing the I/O writes to one or more journal files includes aligning the I/O writes along block boundaries within the one or more journal files. In some embodiments, the method further comprises deleting at least one of the journal files from the deduplicated storage system at the second site after replicating the snapshot to the deduplicated storage system at the second site.

In certain embodiments, the method further comprises notifying a data replication appliance (DPA) at the second site that the snapshot has been replicated, wherein the DPA at the second deletes the at least one of the journal files in response to being notified that the snapshot has been replicated. In various embodiments, intercepting the I/O writes between a host and the LU comprises intercepting the I/O writes using a splitter. In one embodiment, the method further comprises maintaining a replica copy of the LU at the second site using the I/O writes sent from the first site.

According to another aspect of the disclosure, a system comprises one or more processors; a volatile memory; and a non-volatile memory storing computer program code that when executed on the processor causes execution across the one or more processors of a process operable to perform embodiments of the method described hereinabove.

According to yet another aspect of the disclosure, a computer program product tangibly embodied in a non-transitory computer-readable medium, the computer-readable medium storing program instructions that are executable to perform embodiments of the method described hereinabove.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
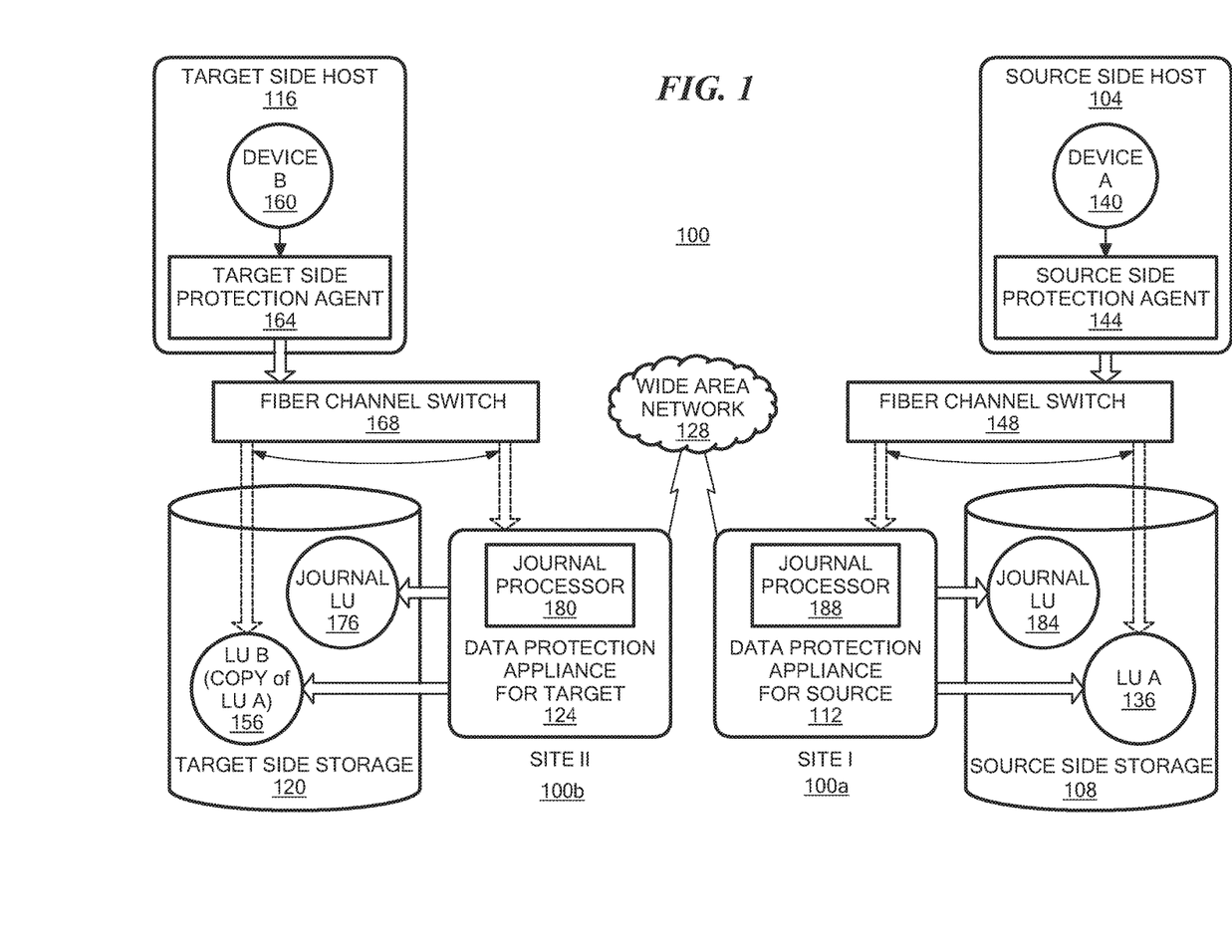
FIG. 1 is a block diagram of a data protection system, according to one embodiment of the disclosure.

Referring to the embodiment of FIG. 1, a data protection system 100 includes two sites: Site I 100*a* and Site II 100*b*. Under normal operation Site I 100*a* may correspond to a source side (i.e., the transmitter within a data replication workflow) of system 100 and Site II 100*b* may be the target side (i.e., the receiver within a data replication workflow) of the system, as shown in FIG. 1. Thus, during normal operations, the direction of replicate data flow may go from Site I 100a to Site II 100b.

In certain embodiments, Site I and Site II may be remote from one another. In other embodiments, the two sites may be local to one another. In particular embodiments, Site I and Site II may be connected via a local area network (LAN). In other embodiments, the two sites may be connected via a wide area network (WAN), such as the Internet.

In particular embodiments, the data protection system may include a failover mode of operation, wherein the direction of replicated data flow is reversed. In such embodiments, Site I may behave as a target side and Site II may behave as the source side. In some embodiments, failover may be triggered manually (e.g., by a user) or automatically. In many embodiments, failover may be performed in the event of a disaster at Site I. In some embodiments, both Site I and Site II may behave as source side for some stored data and may behave simultaneously as a target site for other stored data. In certain embodiments, a portion of stored data may be replicated from one site to the other, and another portion may not be replicated.

In some embodiments, Site I corresponds to a production site (e.g., a facility where one or more hosts run data processing applications that write data to a storage system and read data from the storage system) and Site II corresponds to a backup or replica site (e.g., a facility where replicated production site data is stored). In such embodiments, Site II may be responsible for replicating production site data and may enable rollback of Site I data to an earlier point in time. In many embodiments, rollback may be used in the event of data corruption of a disaster, or alternatively in order to view or to access data from an earlier point in time.

Referring again to FIG. 1, Site I 100a includes a source host 104, a source storage system (or "storage array") 108, and a source data protection appliance (DPA) 112 coupled via a first storage area network (SAN). Similarly, Site II 100b includes a target host 116, a target storage system 120, and a target DPA 124 coupled via a second SAN. Each SAN may include one or more devices (or "nodes") that may be designated an "initiator," a "target", or both. In the embodiment of FIG. 1, the first SAN includes a first fiber channel switch 148 and the second SAN includes a second fiber channel switch 168. Communication links between each host 104, 116 and its corresponding storage system 108, 120 may be any appropriate medium suitable for data transfer, such as fiber communication channel links. In many embodiments, a host communicates with its corresponding storage system using SCSI commands.

Referring back to FIG. 1, hosts 104 and 116 may each correspond to one computer, a plurality of computers, or a network of distributed computers. In some embodiments, a host may include a processor, volatile memory, non-volatile memory, a data bus, an I/O interface, a display interface and a network interface. In certain embodiments, a host may run at least one data processing application, such as a database application and an e-mail server.

Referring again to FIG. 1, each storage system 108, 120 may include storage devices for storing data, such as disks or arrays of disks. In some embodiments, the storage systems may be target nodes. In certain embodiments, in order to enable initiators to send requests to a storage system, the storage system may expose one or more logical units (LU) to which commands are issued. In many embodiments, the storage systems may be SAN entities that provide multiple LUs for access by multiple SAN initiators. In many embodiments, an LU is a physical or virtual logical entity provided by a storage system for accessing data stored therein. In some embodiments, an LU may be a virtual disk accessed by a virtual machine. In certain embodiments, an LU may be identified by a unique logical unit number (LUN).

In the embodiment of FIG. 1, storage system 108 exposes a logical unit 136, designated as LU A, and storage system 120 exposes a logical unit 156, designated as LU B. LU B may be used for replicating LU A. As such, LU B may be generated as a copy of LU A. In one embodiment, LU B may be configured so that its size is identical to the size of LU A.

Referring back to FIG. 1, the source host 104 generates a host device 140 ("Device A") corresponding to LU A and the source host 116 generates a host device 160 ("Device B") corresponding to LU B. In many embodiments, a host device is a logical entity within a host through which the host may access an LU. In some embodiments, an operating system of a host may generate a host device for each logical unit exposed by a storage system in the host SAN.

Referring again to FIG. 1, the source host 104 is configured to act as a SAN initiator that issues I/O requests through host device 140 to LU 136 ("LU A"). In some embodiments, the I/O requests include SCSI commands. In many embodiments, an I/O request includes an address that includes a specific device identifier, an offset within the device, and a data size.

Referring back to FIG. 1, the source DPA 112 and target DPA 124 may perform various data protection services, such as data replication of a storage system, and journaling of I/O requests issued by the hosts 104, 116. When acting as a target DPA, a DPA may also enable rollback of data to an earlier point-in-time (PIT), and processing of rolled back data at the target site. Each DPA 112, 124 may be a physical device, a virtual device running, or may be a combination of a virtual and physical device.

In some embodiments, a DPA may be a cluster of such computers. In many embodiments, a cluster may ensure that if a DPA computer is down, then the DPA functionality switches over to another computer. In some embodiments, computers within a DPA cluster may communicate with one another using at least one communication link suitable for data transfer via fiber channel or IP based protocols, or such other transfer protocol. In certain embodiments, one computer from the DPA cluster may serve as the DPA leader that coordinates other computers in the cluster, and may also perform other tasks that require coordination between the computers, such as load balancing.

In certain embodiments, a DPA may be a standalone device integrated within a SAN. In other embodiments, a DPA may be integrated into a storage system. In some embodiments, the DPAs communicate with their respective hosts through communication lines such as fiber channels using, for example, SCSI commands or any other protocol.

In various embodiments, the DPAs may be configured to act as initiators in the SAN. For example, the DPAs may issue I/O requests using to access LUs on their respective storage systems. In some embodiments, each DPA may also be configured with the necessary functionality to act as targets, e.g., to reply to I/O requests, such as SCSI commands, issued by other initiators in the SAN, including their respective hosts. In certain embodiments, the DPAs, acting as target nodes, may dynamically expose or remove one or more LUs.

Referring again to FIG. 1, as described herein above, Site I and Site II may each behave simultaneously as a production site and a backup site for different logical units. As such, DPA 112 and DPA 124 may each behave as a source DPA for some LUs, and as a target DPA for other LUs, at the same time.

In the embodiment of FIG. 1, hosts 104 and 116 include protection agents 144 and 164, respectively. Protection agents 144 and 164 are configured to intercept SCSI commands issued by their respective hosts to LUs via host devices (e.g. host devices 140 and 160). A protection agent may act on an intercepted SCSI command issued to a logical unit, in one of the following ways: send the SCSI commands to its intended LU; redirect the SCSI command to another LU; split the SCSI command by sending it first to the respective DPA and, after the DPA returns an acknowledgement, send the SCSI command to its intended LU; fail a SCSI command by returning an error return code; and delay a SCSI command by not returning an acknowledgement to the respective host. A protection agent 144, 164 may handle different SCSI commands, differently, according to the type of the command. For example, a SCSI command inquiring about the size of a certain LU may be sent directly to that LU, whereas a SCSI write command may be split and sent first to a DPA within the host's site.

In various embodiments, a protection agent may change its behavior for handling SCSI commands, for example as a result of an instruction received from the DPA. In certain embodiments, the behavior of a protection agent for a certain host device may depend on the behavior of its associated DPA with respect to the LU of the host device. In some embodiments, when a DPA behaves as a source site DPA for a certain LU, then during normal course of operation, the associated protection agent may split I/O requests issued by a host to the host device corresponding to that LU. In particular embodiments, when a DPA behaves as a target device for a certain LU, then during normal course of operation, the associated protection agent fails I/O requests issued by the host to the host device corresponding to that LU.

Referring back to FIG. 1, communication between a protection agent 144, 164 and its respective DPA 112, 124 may use any protocol suitable for data transfer within a SAN, such as fiber channel, or SCSI over fiber channel. The communication may be direct, or via a logical unit exposed by the DPA.

In certain embodiments, protection agents may be drivers located in their respective hosts. Alternatively, a protection agent may also be located in a fiber channel switch, or in any other device situated in a data path between a host and a storage system or on the storage system itself. In a virtualized environment, the protection agent may run at the hypervisor layer or in a virtual machine providing a virtualization layer.

Referring again to FIG. 1, the target storage system 120 exposes a journal LU 176 for maintaining a history of write transactions made to LU 156, referred to herein as a "journal." A journal may be used to provide access to storage at specified points in time, as discussed further below in conjunction with FIG. 2. In some embodiments, the journal may be stored across multiple LUs (e.g., using striping).

In the embodiment of FIG. 1, the target DPA 124 includes a journal processor 180 for managing the journal within LU 176. The journal processor 180 is configured to manage the journal entries of LU B 156. Specifically, journal processor 180 may enter write transactions received by the target DPA 124 from the source DPA 112 into the journal by writing them into the journal LU 176, read the undo information for the transaction from LU B 156, update the journal entries in the journal LU 176 with undo information, apply the journal transactions to LU B 156, and remove already-applied transactions from the journal.

In one embodiment, the journal processor 180 may be configured to perform processing described in the patent titled "METHODS AND APPARATUS FOR OPTIMAL JOURNALING FOR CONTINUOUS DATA REPLICATION" and with U.S. Pat. No. 7,516,287, issued Apr. 7, 2009, which is hereby incorporated by reference.

Embodiments of the data replication system may be provided as physical systems for the replication of physical LUs, or as virtual systems for the replication of virtual LUs. In one embodiment, a hypervisor may consume LUs and may generate a distributed file system on the logical units such as VMFS, for example, generates files in the file system and exposes the files as LUs to the virtual machines (each virtual machine disk is seen as a SCSI device by virtual hosts). In another embodiment, a hypervisor may consume a network based file system and exposes files in the NFS as SCSI devices to virtual hosts.

Referring back to FIG. 1, in normal operation (sometimes referred to as "production mode"), the DPA 112 acts as a source DPA for LU 136 ("LU A"). Thus, protection agent 144 is configured to act as a source protection agent, specifically by splitting I/O requests to host device 140 ("Device A"). The protection agent 144 may send an I/O request to source DPA 112 and, after receiving an acknowledgement therefrom, may send the I/O request to LU 136. After receiving a second acknowledgement from storage system 108, the host 104 may acknowledge that the I/O request has successfully completed.

When source DPA 112 receives a replicated I/O request from protection agent 144, source DPA 112 may transmit certain I/O information characterizing the write request, packaged as a "write transaction", over WAN 128 to the target DPA 124 for journaling and for incorporation within target storage system 120. When applying write operations to storage system 120, the target DPA 124 may act as an initiator, and may send SCSI commands to LU 156 ("LU B").

The source DPA 112 may send its write transactions to target DPA 124 using a variety of modes of transmission, including inter alia (i) a synchronous mode, (ii) an asynchronous mode, and (iii) a batch mode. In synchronous mode, the source DPA 112 may send each write transaction to the target DPA 124, may receive back an acknowledgement from the target DPA 124, and in turns may send an acknowledgement back to protection agent 144.

In synchronous mode, protection agent 144 may wait until receipt of such acknowledgement before sending the I/O request to LU 136. In asynchronous mode, the source DPA 112 may send an acknowledgement to protection agent 144 upon receipt of each I/O request, before receiving an acknowledgement back from target DPA 124.

In batch mode, the source DPA 112 may receive several I/O requests and combines them into an aggregate "batch" of write activity performed in the multiple I/O requests, and may send the batch to the target DPA 124, for journaling and for incorporation in target storage system 120. In batch mode, the source DPA 112 may send an acknowledgement to protection agent 144 upon receipt of each I/O request, before receiving an acknowledgement back from the target DPA 124.

As discussed above, in normal operation, LU B 156 may be used as a backup of LU A 136. As such, while data written to LU A by host 104 is replicated from LU A to LU B, the target host 116 should not send I/O requests to LU B. To prevent such I/O requests from being sent, protection agent 164 may act as a target side protection agent for host device B 160 and may fail I/O requests sent from host 116 to LU B 156 through host device B 160.

Still referring to FIG. 1, in recovery mode, the target DPA 124 may undo the write transactions in the journal LU 176 so as to restore the target storage system 120 to an earlier state.

Figure 2:
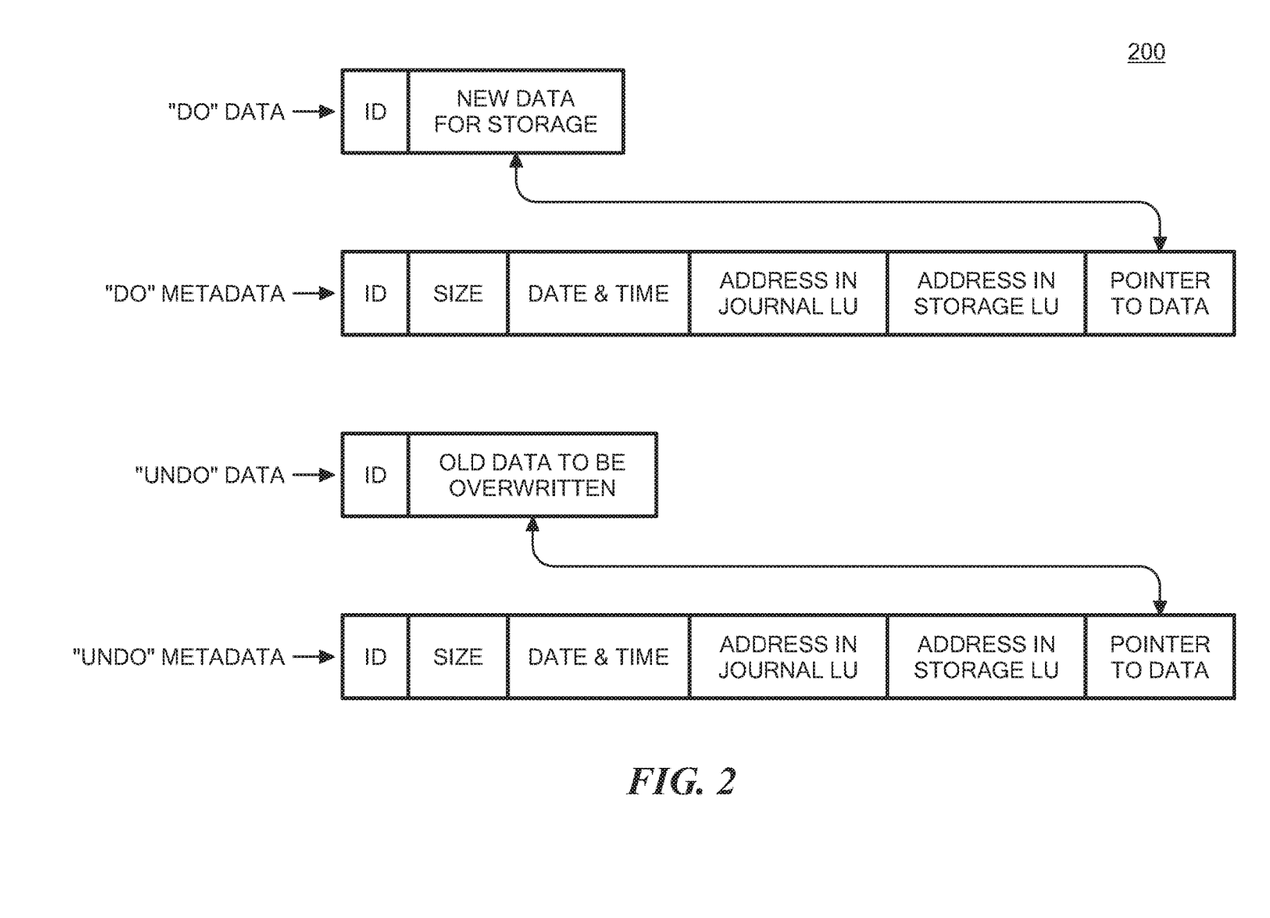
FIG. 2 is a diagram illustrating a journal history of write transactions for a storage system, according to one embodiment of the disclosure.

Referring to the embodiment of FIG. 2, a write transaction 200 may be included within a journal and stored within a journal LU, in accordance with an embodiment. The write transaction 200 includes one or more identifiers; a time stamp indicating the date and time at which the transaction was received by the source DPA; a write size indicating the size of the data block; a location in the journal LU where the data is entered; a location in the target LU where the data is to be written; and the data itself.

Referring briefly to both FIGS. 1 and 2, the transaction 200 may correspond to a transaction transmitted from the source DPA 112 to target DPA 124. The target DPA 124 may record the write transaction 200 in the journal that includes four streams. A first stream, referred to as a "DO" stream, includes a copy of the new data for writing to LU B 156. A second stream, referred to as a "DO METADATA" stream, includes metadata for the write transaction, such as an identifier, a date and time, a write size, the offset within LU B 156 where the new data is written, and a pointer to the offset in the DO stream where the corresponding data is located. A third stream, referred to as an "UNDO" stream, includes a copy of the data being overwritten within LU B 156 (referred to herein as the "old" data). A fourth stream, referred to as an "UNDO METADATA" stream, includes an identifier, a date and time, a write size, a beginning address in LU B 156 where data was (or will be) overwritten, and a pointer to the offset in the UNDO stream where the corresponding old data is located.

Since the journal contains the "undo" information necessary to rollback storage system 120, data that was stored in specific memory locations at a specified point in time may be obtained by undoing write transactions that occurred subsequent to such point in time.

Each of the four streams may hold a plurality of write transaction data. As write transactions are received dynamically by target DPA, the write transactions may be recorded at the end of the DO stream and the end of the DO METADATA stream, prior to committing the transaction.

In some embodiments, a metadata stream (e.g., UNDO METADATA stream or the DO METADATA stream) and the corresponding data stream (e.g., UNDO stream or DO stream) may be kept in a single stream by interleaving metadata and data.

Figure 3:
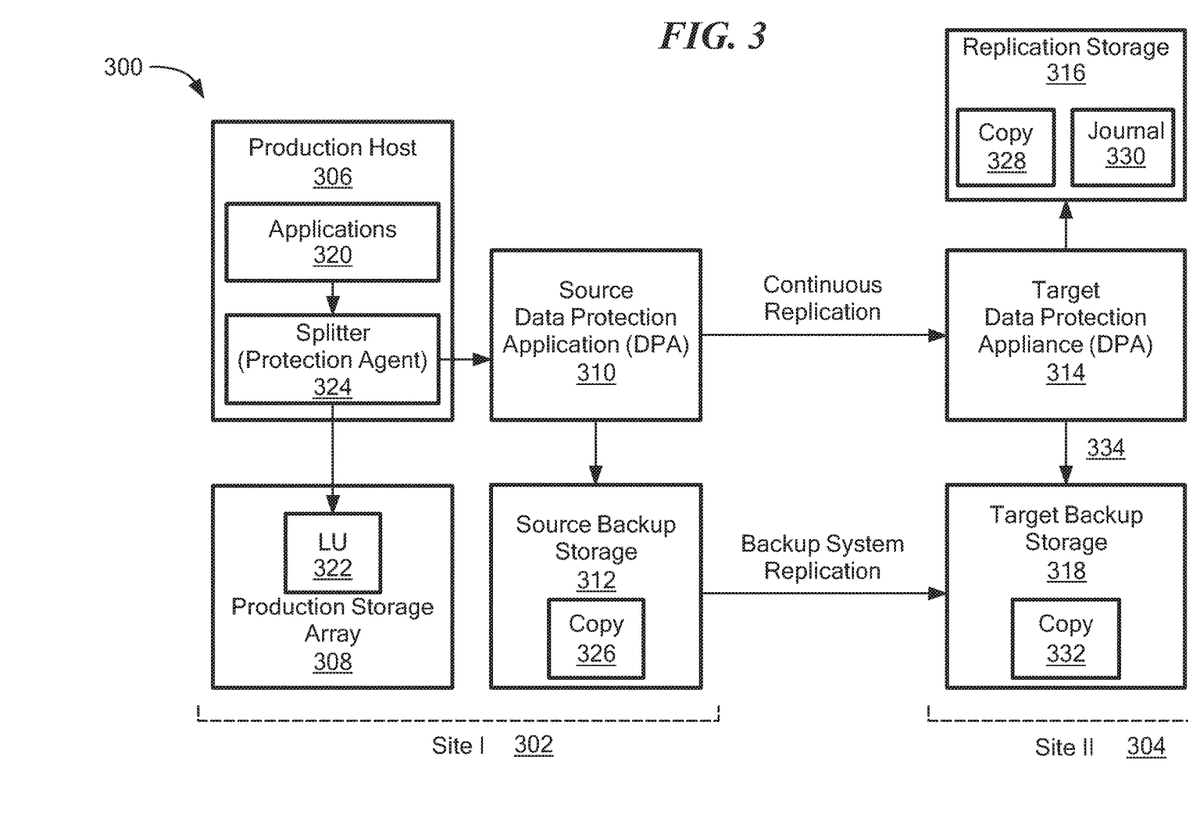
FIG. 3 is a block diagram of a data production system using multi-level data replication, according to one embodiment of the disclosure.

Referring to FIG. 3, a data protection system 300 uses both continuous and backup data replication, according to an embodiment of the disclosure. The system 300 includes a production site ("Site I") 302 and a replication site ("Site II") 304, which may correspond to separate physical or virtual data centers.

The production site 302 includes a production host 306, a production storage array 308, a source data protection appliance (DPA) 310, and a source backup storage system 312. In one embodiment, the source host, production storage array, and source DPA may be the same as or similar to source host 104, source storage array 108, and source DPA 112, respectively, as shown in FIG. 1 and described above in conjunction therewith.

Referring back to FIG. 3, the replication site 304 includes a target DPA 314, replication storage 316, and a target backup storage system 318. In a certain embodiment, the target DPA and replication storage may be the same as or similar to target DPA 124 and target storage 120, respectively, as shown in FIG. 1 and described above in conjunction therewith. In various embodiments, source and/or target backup storage systems may be deduplicated storage systems. In some embodiments, a deduplicated storage system is any storage system capable of detecting redundant data within two different stored entities (e.g., blocks, objects, or files) and storing only a single copy of redundant data. In certain embodiments, source and/or target backup storage systems may be EMC® DATADOMAIN® systems.

Referring again to FIG. 3, the production host 306 includes applications 320 that send I/Os to LU 322 within the production storage array 308. A splitter 324 may intercept I/Os and send intercepted I/Os to the DPA 310. After the DPA 310 acknowledges a given I/O, the splitter 324 may send it to the LU 322. In the embodiment of FIG. 3, the splitter 324 is included within the production host 306. In other embodiments, the splitter may be located within the production storage array. In one embodiment, the splitter may be the same as or similar to source protection agent 144 of FIG. 1. In various embodiments, the production host corresponds to a virtual machine (VM) and the splitter may be provided within a hypervisor.

Referring back to FIG. 3, the source DPA 310 may include a journal processor (e.g., journal processor 188 of FIG. 1) that generates write transactions based on the I/Os received from the splitter. The source DPA 310 sends the write transactions to the target DPA 314 in continuous manner. Referring to FIG. 3, the source DPA may also periodically send writes to source backup storage 312. In other embodiments, the source backup storage system may receive writes directly from the production storage array (i.e., not from the source DPA).

Referring again to FIG. 3, the target DPA 314 may receive write transactions streamed from the source DPA 310 and, in turn, send I/Os to replication storage 316 which includes a replicated copy 328 of the LU 322 within the production storage array 308. In addition, the target DPA 314 may enter the received write transactions into a journal 330. Thus, the data protection system 300 provides continuous data replication of production host data within LU 322.

The source backup storage system 312 may maintain one or more copies (or "snapshots") 326 of the production LU 322. In addition, the source backup storage system 312 may be configured to replicate such copies to the remote backup storage system 318 (e.g., to generate replicated copy 332). In some embodiments, there may be a relatively long delay (e.g., several hours) between data being received by the source backup storage system and that data being replicated to the remote backup storage system.

Referring again to FIG. 3, the data protection system 300 provides two levels of data replication for LU 322: continuous replication via the DPAs 310, 314 and backup replication via the backup storage systems 312, 318. In existing systems, this may result in redundant network traffic between the production site 302 and the replication site 304 because each change may be first transmitted between the DPAs 310, 314 and later transmitted between the backup storage systems 312, 318.

In may embodiments, the data protection system can reduce bandwidth between the sites (e.g., sites 302 and 304) by having the target DPA send replicated I/Os (i.e., I/Os received from the source DPA 310) to the target backup storage, and by relying on deduplication functionality within the target backup storage system, as discussed below in conjunction with FIG. 4.

Figure 4:
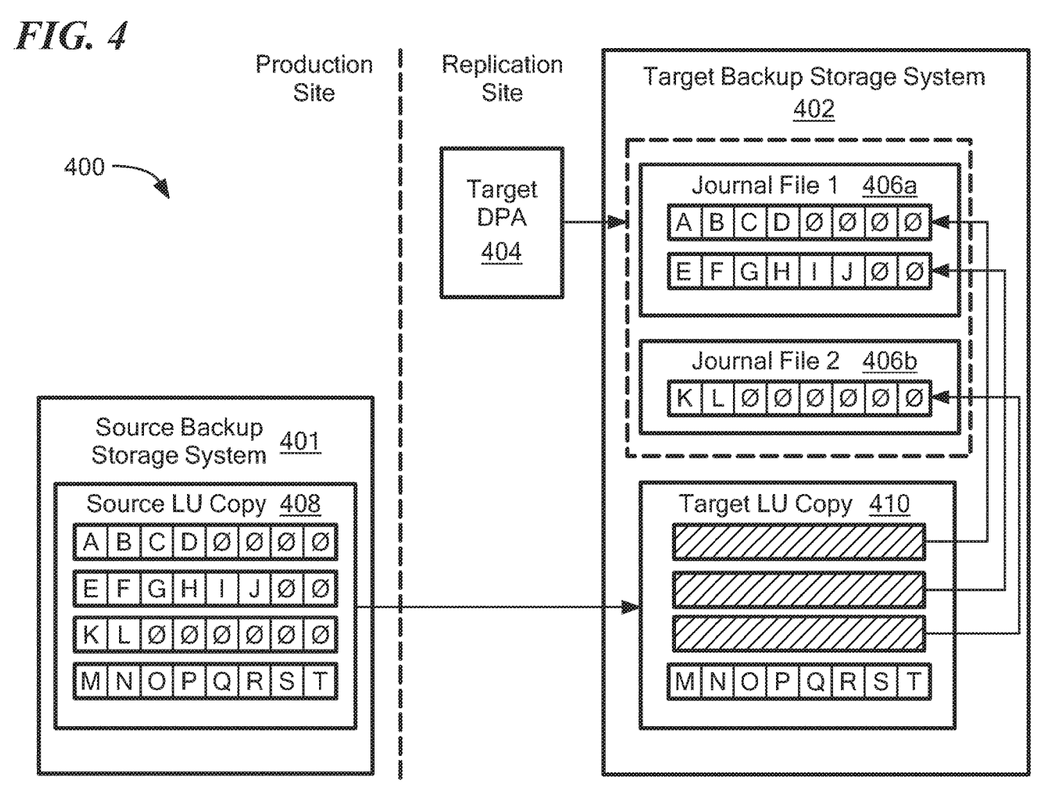
FIG. 4 is another block diagram of a data production system using multi-level data replication, according to one embodiment of the disclosure.

Referring to FIG. 4, a data protection system 400 includes a source backup storage system 401, a target backup storage system 402, and a target data protection agent (DPA) 404, according to an embodiment of the disclosure. In one embodiment, the source backup storage system, target backup storage system, and a target DPA may be the same as or similar to source backup storage 312, target back storage 318, and target DPA 314 as shown in FIG. 3 and described above in conjunction therewith.

Referring back to FIG. 4, the target backup storage system 402 is a deduplicated storage system that can detect and deduplicate redundant data at the block level (e.g., within 8K blocks). When an I/O write request is sent to the target backup storage system 402, it segments the write data into blocks and determines if any of the blocks are redundant with previously stored blocks (i.e., if any previously stored block has identical data). For blocks that are unique (i.e., not redundant), the target backup storage system 402 stores the actual block data. For blocks that are redundant, the target backup storage system 402 stores a reference to the previously stored block having the same data. In one embodiment, the target backup storage system is an EMC® DATA-DOMAIN® system.

In certain embodiments, the target backup storage system uses variable-length segmentation to break up data streams for increased deduplication rates. In such embodiments, as the target backup storage system ingests data, it may intelligently break up the stream based on the natural structure of the data. In some embodiments, the stream may be broken into fixed-size blocks.

In various embodiments, the target backup storage system generates and stores signatures for each block of data stored therein. In such embodiments, when a block is added to the target backup storage system, it may generate the block's signature and compare it to existing signatures to determine if the block is unique or redundant. In some embodiments, the signatures are hash values.

Referring again to FIG. 4, the target backup storage system 402 may provide a protocol that can be used by a remote system to reduce the amount of data that needs to be transmitted when replicating a file (e.g., an LU snapshot). In particular, a remote system can determine which portions (e.g., blocks) of the file are unique—and which are redundant—to data already stored in target backup storage 402. For unique blocks, the remote system may send the actual block data. For redundant blocks, the remote system can send metadata instead of the actual block data. In some embodiments, this functionality may be similar to that provided by EMC® Data Domain® Boost™ In such embodiments, only unique data may be sent from the source backup storage system to the target backup storage system.

Referring to the embodiment of FIG. 4, as the target DPA 404 receives continuously replicated data (e.g., from source DPA 310 in FIG. 3), it writes the replicated data to a journal file 406 within the target backup storage system 402. In certain embodiments, the target DPA streams all I/Os to particular journal files. In some embodiments, the target DPA creates new journal files periodically (e.g., every hour) and streams all I/Os to that journal file for the duration of the time period.

As discussed above, in some embodiments the backup storage replication may take several hours to occur. Thus, referring to FIG. 4, when source backup storage 401 replicates an LU snapshot 408 to the target backup storage 402, all snapshot data may have already been streamed by the DPA 404 to a journal file 406 and is thus considered redundant. Using the protocol functionality described above, the source storage backup storage system 401 can avoid sending the redundant data over a network (e.g., the Internet or another wide-area-network), thereby reducing bandwidth usage.

In the embodiment of FIG. 4, the target DPA 404 may continuously receive I/Os replicated from a production LU (e.g., LU 322 in FIG. 3). During a first time period, the DPA 404 may write I/Os to a first journal file 406a within the target backup storage system 402. During a second time period, the DPA 404 may write I/Os to a second journal file 406b. The first journal file 406a includes two blocks: a first block having data A, B, C, D and a second block having data E, F, G, H, I, and J (the symbol "0" in FIG. 4 refers to null or zero data). The second journal file 406b includes a single block having data K and L.

Subsequently, the source backup storage system 401 may replicate a snapshot 408 of the LU to the target backup storage system 402. In this simplified example shown in FIG. 4, the snapshot 408 includes four blocks: a first block having data A, B, C, and D; a second block having data E, F, G, H, I, J; a third block having data K and L, and a fourth block having data M, N, O, P, Q, R, S, and T. The source backup storage system 401 determines that the first three blocks are redundant and, thus, does not send the contents of these blocks over the network to target backup storage 402. Instead, the source backup storage system 401 may send metadata about the first three blocks to the target backup storage system 402. In some embodiments, the metadata includes, for each redundant block, a signature of the block (e.g., a hash value) and the location of the block within the snapshot 408. In the embodiment of FIG. 4, only one block (M, N, O, P, Q, R, S, and T) is unique compared to data within the target backup storage 402 and, thus, only this block's data needs to be sent to the target backup storage system 402.

Using the metadata for the redundant blocks and the actual data for the unique block(s), the target backup storage system 402 can generate a deduplicate snapshot replica 410, as shown. In FIG. 4, hatched blocks within the snapshot replica 410 represent references to deduplicated blocks of data within the journal files 406.

In various embodiments, replication data streamed by the target DPA may be aligned in a journal file to increase the chances that deduplication will occur. For example, if an I/O is not aligned on block-size boundaries (e.g., 8K boundaries), it may be truncated so that the start and end offset of the I/O are on block boundaries within a journal file.

In some embodiments, after a snapshot is replicated from source backup storage to target backup storage, journal files (e.g., files 406a and 406b) may be deleted. For example, if a snapshot of an LU is replicated from the source backup storage system, all journal files corresponding to time periods before the snapshot was taken may be deleted.

Figure 5:
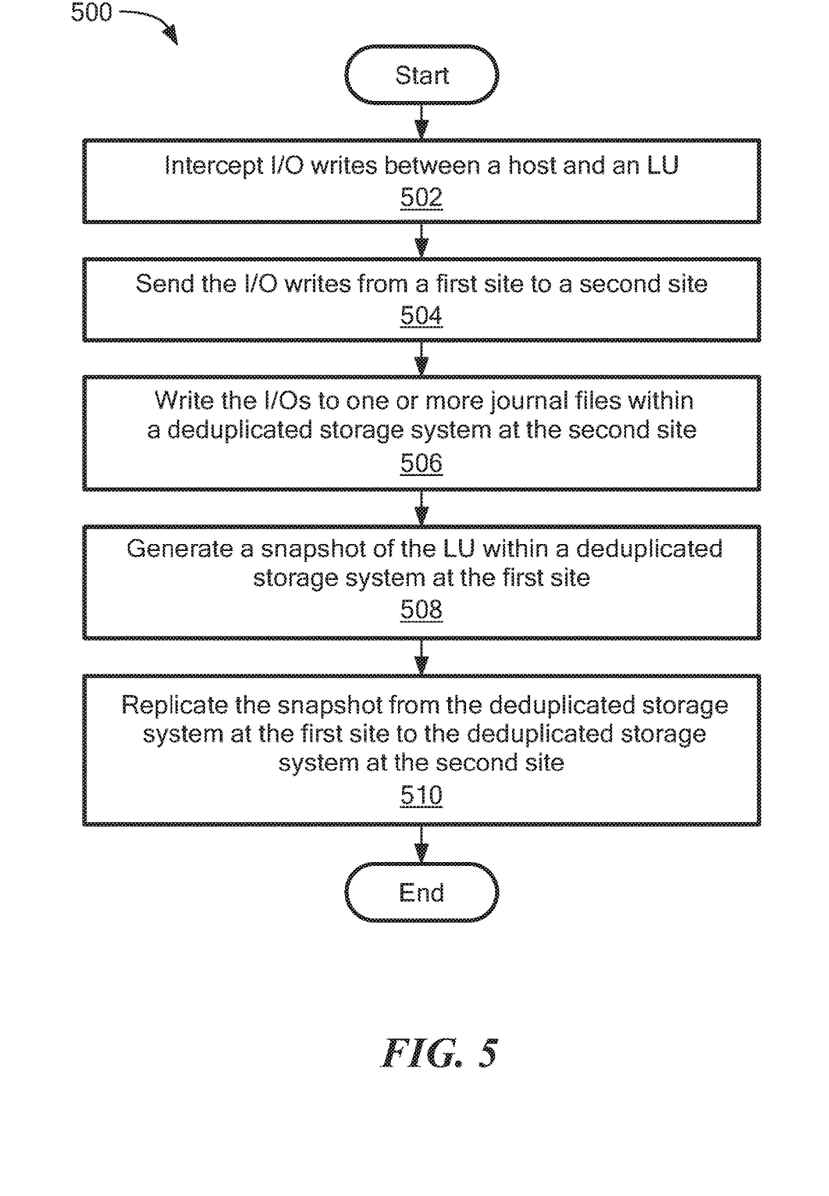
FIG. 5 is flow diagram of a method to reduce bandwidth in systems where both continuous and backup data replication are used.

FIG. 5 is a flow diagram showing illustrative processing that can be implemented within data protection system (e.g., data protection system 300 of FIG. 3). Rectangular elements (typified by element 502 in FIG. 5), herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring to FIG. 5, a method 500 can reduce bandwidth in systems where both continuous and backup data replication are used. At block 502, I/O writes may be intercepted between a host and an LU (e.g., between host 306 and LU 322 in FIG. 3). In some embodiments, the I/O writes may be intercepted by a splitter (e.g., splitter 324 in FIG. 3).

Referring back to FIG. 5, at block 504, the I/O writes are sent from a first site to a second site (e.g., from a production site to a backup site). At block 506, the I/Os are written to one or more journal files within a deduplicated storage system. In some embodiments, the I/Os may be aligned (e.g., along block boundaries) within the journal files to increase the chances that deduplication will occur. In certain embodiments, journal files are created periodically (e.g., every hour) and, as I/Os are received at the second site, they are written to the journal file corresponding to the current time period.

Referring again to FIG. 5, at block 508, a snapshot of the LU is generated within a deduplicated storage system at the first site (e.g., within source backup storage 312 of FIG. 3). As used herein, the term "snapshot" refers to a point-in-time copy of the LU.

Referring back to FIG. 5, at block 510, the snapshot is replicated from the deduplicated storage system at the first site to the deduplicated storage system at the second site. Using protocol functionality provided by deduplicated storage, portions of the snapshot that are redundant with data in the journal files need not be transferred between the first and second sites. For example, the deduplicated storage systems at the first site may generate signatures (e.g., hash values) for each block of snapshot data and send the signatures to the deduplicated storage system at the second site. The deduplicated storage system may respond by identifying which blocks are unique and which are redundant.

In some embodiments, journal files may be deleted from the deduplicated storage system after the snapshot is replicated. In certain embodiments, a DPA at the second site is notified that the snapshot has been replicated and, in response, the DPA at the second site may delete journal files correspond to a time period covered by the snapshot.

Figure 6:
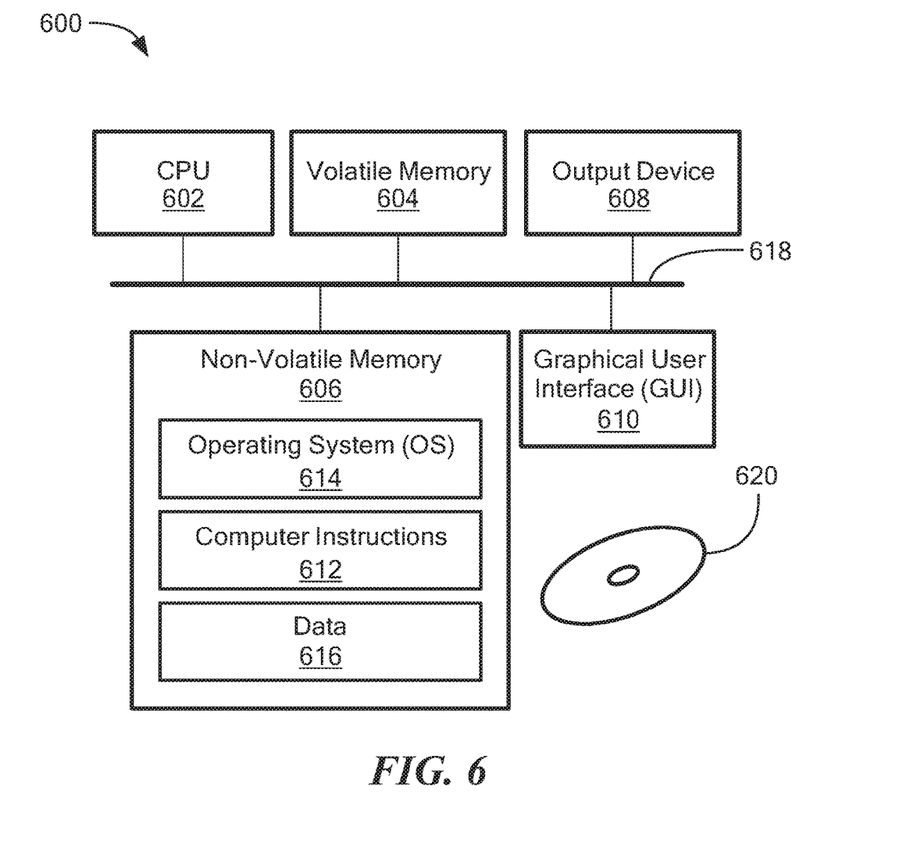
FIG. 6 is a block diagram of a computer on which the method of FIG. 5 may be implemented, according to an embodiment of the disclosure.

FIG. 6 shows a computer 600 that can perform at least part of the processing described herein, according to one embodiment. The computer 600 may include a processor 602, a volatile memory 604, a non-volatile memory 606 (e.g., hard disk), an output device 608 and a graphical user interface (GUI) 610 (e.g., a mouse, a keyboard, a display, for example), each of which is coupled together by a bus 618. The non-volatile memory 606 may be configured to store computer instructions 612, an operating system 614, and data 616. In one example, the computer instructions 612 are executed by the processor 602 out of volatile memory 604. In one embodiment, an article 620 comprises non-transitory computer-readable instructions. In some embodiments, the computer 600 corresponds to a virtual machine (VM). In other embodiments, the computer 600 corresponds to a physical computer.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:
1. A system comprising:
one or more processors;
a volatile memory; and
a non-volatile memory storing computer program code which when executed on the processor causes the one or more processors to perform the operations of:

intercepting I/O writes between a host and a logical unit (LU);
sending the I/O writes from a first site to a second site;
writing the I/O writes to one or more journal files within a deduplicated storage system at the second site wherein writing the I/O writes to the one or more journal files includes re-aligning at least some the I/O writes along deduplication block boundaries within the one or more journal files;
generating an original snapshot of the LU at the first site;
redacting the original snapshot to generate a redacted snapshot by omitting, from the redacted snapshot, one or more data blocks of the original snapshot that correspond to the I/O writes sent from the first site to the second site;
generating metadata corresponding to the redacted snapshot, the metadata including a respective hash for each of the omitted data blocks and a respective indication of the location, within the original snapshot, of each of the omitted data blocks; and
transmitting the redacted snapshot and the metadata corresponding to the redacted snapshot from the first site to the deduplicated storage system at the second site.

2. The system of claim 1 wherein the computer program code further causes the one or more processor to perform the operation of deleting at least one of the journal files from the deduplicated storage system at the second site after replicating the snapshot to the deduplicated storage system at the second site.

3. The system of claim 2 wherein
the computer program code further causes the one or more Processors to perform the operation of notifying a data replication appliance (DPA) at the second site that the snapshot has been replicated, and
the DPA at the second site deletes the at least one of the journal files in response to being notified that the snapshot has been replicated.

4. The system of claim 1 wherein intercepting the I/O writes between a host and the LU comprises intercepting the I/O writes using a splitter.

5. The system of claim 1 further comprising maintaining a replica copy of the LU at the second site using the I/O writes sent from the first site.

6. A computer implemented method comprising:
intercepting I/O writes between a host and a logical unit (LU);
sending the I/O writes from a first site to a second site;
writing the I/O writes to one or more journal files within a deduplicated storage system at the second site;
generating an original snapshot of the LU at the first site;
redacting the original snapshot to generate a redacted snapshot by omitting, from the redacted snapshot, one or more data blocks of the original snapshot that correspond to the I/O writes sent from the first site to the second site;
generating metadata corresponding to the redacted snapshot, the metadata including a respective hash for each of the omitted data blocks and a respective indication of the location, within the original snapshot, of each of the omitted data blocks; and
transmitting the redacted snapshot and the metadata corresponding to the redacted snapshot from the first site to the deduplicated storage system at the second site.

7. The method of claim 6 wherein writing the I/O writes to the one or more journal files includes aligning the I/O writes along block boundaries within the one or more journal files.

8. The method of claim 6 further comprising:
deleting at least one of the journal files from the deduplicated storage system at the second site after replicating the redacted snapshot to the deduplicated storage system at the second site.

9. The method of claim 8 further comprising:
notifying a data replication appliance (DPA) at the second site that the redacted snapshot has been replicated, wherein the DPA at the second site deletes the at least one of the journal files in response to being notified that the redacted snapshot has been replicated.

10. The method of claim 6 wherein intercepting the I/O writes between a host and the LU comprises intercepting the I/O writes using a splitter.

11. The method of claim 6 further comprising maintaining a replica copy of the LU at the second site using the I/O writes sent from the first site.

12. A computer program product tangibly embodied in a non-transitory computer-readable medium, the computer-readable medium storing program instructions that are executable by one or more processors to:
intercept I/O writes between a host and a logical unit (LU);
send the I/O writes from a first site to a second site;
write the I/O writes to one or more journal files within a deduplicated storage system at the second site wherein writing the I/O writes to the one or more journal files includes re-alignment of least some the I/O writes along deduplication block boundaries within the one or more journal files;
generate an original snapshot of the LU at the first site;
redact the original snapshot to generate a redacted snapshot by omitting, from the redacted snapshot, one or more data blocks of the original snapshot that correspond to the I/O writes sent from the first site to the second site;
generate metadata corresponding to the redacted snapshot, the metadata including a respective hash for each of the omitted data blocks and a respective indication of the location, within the original snapshot, of each of the omitted data blocks; and
transmit the redacted snapshot and the metadata corresponding to the redacted snapshot from the first site to the deduplicated storage system at the second site.

13. The computer program product of claim 12 further storing program instructions that are executable to delete at least one of the journal files from the deduplicated storage system at the second site after replicating the snapshot to the deduplicated storage system at the second site.

14. The computer program product of claim 13 further storing program instructions that are executable to:
notify a data replication appliance (DPA) at the second site that the snapshot has been replicated,
wherein the DPA at the second site deletes the at least one of the journal files in response to being notified that the snapshot has been replicated.

15. The computer program product of claim 12 wherein intercepting the I/O writes between a host and the LU comprises intercepting the I/O writes using a splitter.

16. The computer program product of claim 12 further comprising maintaining a replica copy of the LU at the second site using the I/O writes sent from the first site.

* * * * *